United States Patent [19]
Sone et al.

[11] Patent Number: 5,577,032
[45] Date of Patent: Nov. 19, 1996

[54] BROADCAST SERVICE SYSTEM

[75] Inventors: Yukio Sone, Kawasaki; Takashi Nagashima, Yokohama; Takashi Kato, Fukuoka, all of Japan

[73] Assignee: Fujitsu Limited, Kanagawa, Japan

[21] Appl. No.: 120,376

[22] Filed: Sep. 10, 1993

[30] Foreign Application Priority Data

Sep. 11, 1992 [JP] Japan .................................. 4-242985
Oct. 19, 1992 [JP] Japan .................................. 4-280204

[51] Int. Cl.⁶ .................................................. H04L 12/56
[52] U.S. Cl. ....................... 370/58.3; 370/60.1; 370/94.2; 370/110.1
[58] Field of Search ................... 370/94.1, 58.2, 370/58.3, 94.3, 18, 53, 54, 58.1, 62, 105, 110.1, 60, 60.1, 94.2; 348/6, 7, 8; 455/3.1, 3.3; 379/93, 94, 219, 220

[56] References Cited

U.S. PATENT DOCUMENTS

| | | | |
|---|---|---|---|
| 4,716,410 | 12/1987 | Nozaki | 348/6 |
| 4,890,320 | 12/1989 | Monslow et al. | 348/7 |
| 5,042,062 | 8/1991 | Lee et al. | 379/54 |
| 5,265,088 | 11/1993 | Takigawa et al. | 370/58.2 |
| 5,265,091 | 11/1993 | van Landegem | 370/60 |
| 5,287,530 | 2/1994 | Davis et al. | 370/94.1 |
| 5,365,524 | 11/1994 | Hiller et al. | 370/94.2 |

FOREIGN PATENT DOCUMENTS 62-241458  10/1987  Japan .
254646    2/1990   Japan .

*Primary Examiner*—Alpus H. Hsu
*Assistant Examiner*—Ricky Q. Ngo

[57] ABSTRACT

The present invention relates to a broadcast service system where a broadcast transmission terminal is connected to a broadcast reception terminal through a plurality (large number) of switching nodes. The object of the invention is to provide a broadcast service system which has a small number of connection paths between switching nodes and can receive selectively, freely and arbitrarily broadcast program from the broadcast reception terminal. In the broadcast service system where a broadcast transmission terminal is connected to a broadcast reception terminal via a network having plural or many switching nodes, distribution modules, which control distributively input information, are formed so as to arrange to each or some of the switching nodes as an external circuit to an exchange switch in corresponding switching nodes.

18 Claims, 13 Drawing Sheets

◎ ATM SWITCHING NODE WITH DISTRIBUTION MODULE

○ ATM SWITCHING NODE WITHOUT DISTRIBUTION MODULE

BROADCAST SERVICE SYSTEM

BACKGROUND OF THE INVENTION

1) Field of the Invention

The present invention relates to a broadcast service system where a broadcast transmission terminal is connected to a broadcast reception terminal through plural or large number of switching nodes.

2) Description of the Related Arts

Recently, with a progress on the switching technology field, integrated services digital network (ISDN) has been widely spread and has been developed to broad-band (B-) ISDN. It has been expected that future broad-band switching services will be adjusted as communication infrastructure while broadcasting will be expansively utilized as switching services.

Conventional inhouse broadcast servicing means includes (1) wireless broadcasting services utilizing satellite communication, (2) CATV utilizing private lines, and (3) TV conference services utilizing ISDN.

An economic problem occurs because the items (1) and (2) require an independent network in addition to the inhouse network. As for the item (3), the transmission efficiency is poor because an external device controls the whole network.

FIG. 12 is a diagram showing the first example of a conventional broadcast service system. In such a broadcast service system, a broadcast transmission terminal (for example, TV camera shown in FIG. 12) 1 on the transmission side reads an image information to convert into an electric signal and then transmits the image information from the antenna 2 by wireless. On a reception side, the image information is received with the antenna 3-$i$ ($i$=1~N where N is a natural number) to display a desired image on a cathode-ray tube of a broadcast reception terminal (for example, a television set) 4-$i$. Since plural broadcast transmission terminals 1 have respective allocated channels, each of the plural broadcast reception terminals 4-$i$ can select a desired channel.

FIG. 13 is a diagram showing the second example of the conventional broadcast service system utilizing cable communications. Such a system is used, for example, for television conference systems. Like numerals represent similar elements to those shown in FIG. 12. In such a broadcast service system, the broadcast transmission terminal (for example, a TV camera) 1 on a transmission side reads image information, and converts it into an electric signal to input to multipoint conference device (center) 5. Then the multipoint conference device 5 inputs the received image information to the first switching node 6-1. The switching node 6-1 executes a switching operation to a necessary path in accordance with a destination selection signal sent from the multipoint conference device 5.

Furthermore, the output of the first switching node 6-1 is sent to the second switching node 6-2 which controls a further switching operation to desired paths. The output of the second switching node 6-2 is sent to desired paths. On the reception side, respective broadcast reception terminals (for example, TV sets) 4-$i$ receive image information to display it on CRTs. This example shows only two switching nodes, but a desired number of switching nodes may be arranged.

The broadcast service system shown in FIG. 14 may be considered. In this example, the image information read by the broadcast transmission terminal 1 on the transmission side is inputted to a terminal adapter (TA) 10 to convert into an asynchronous transfer mode (ATM) cell. In order to execute an ATM conversion by the terminal adapter 10, broadcast information, transmission information, and a channel number N are added to the header portion of the information. The added information can identify a specific broadcast transmission terminal 1, when the image information from plural broadcast transmission terminals 1 are converted into ATM cells.

The output of the terminal adapter 10 is sent to the distribution module 13 via the first ATM switching node 11-1. The ATM switching node 11-1 is connected to the distribution module 13 through a subscriber line signal interface. The distribution module 13 can be regarded as an ISDN terminal when it is viewed from the ATM switching node 11-1.

Respective broadcast reception terminals (in this example, a TV set) 4-$i$ on the reception side transmit a feature access code to the ATM switching node 11-2 for requesting information of broadcast/reception/channel N. When the ATM switching node 11-2 receives the feature access code, it makes paths corresponding to the number of received broadcast reception terminals and has access to the distribution module 13 via the first ATM switching node 11-1, whereby desired image information can be received.

In the current broadcast service systems described above, it is general to execute a connection control using the multipoint connection device as shown in FIG. 13. In this case, since the distribution function is converged on the center side, when communication is made through plural switching nodes, the connection paths between broadcast reception terminals and multipoint connecting devices are needed between switching nodes to the number of broadcast reception terminals. Since the connection status enables only an uni-directional communication to the center side, the broadcast services for plural contents cannot be realized.

Moreover, when the broadcast service system shown in FIG. 14 is used, the distribution module 13 connected to the ATM switching node 11-1 copies a cell and transmits it to the ATM switching node 11-2, the connection paths are needed between the switching nodes 11-1 and 11-2 by the number of broadcast reception terminals. Therefore there is a disadvantage in that the transmission efficiency between the switching nodes 11-1 and 11-2 is poor.

SUMMARY OF THE INVENTION

The present invention is made to overcome the above mentioned problems. An object of the present invention is to provide a broadcast service system which has a small number of connection paths between switching nodes and can receive arbitrarily, freely and selectively broadcast programs from a broadcast reception terminal.

In order to achieve the object of the present invention, the broadcast service system wherein a broadcast transmission terminal is connected to a broadcast reception terminal through a plurality of switching nodes, is characterized in that a distribution module for controlling distributively input information, the distribution module being arranged as an external circuit to an exchange switch in each of the plurality of switching nodes.

According to the present invention, a broadcast service system wherein a broadcast transmission terminal is connected to a broadcast reception terminal through a network including plural switching nodes, is characterized in that plural distribution modules for controlling distributively input information, each of the plural distribution modules being used as an external circuit to an exchange switch within each of the switching nodes, the distribution modules being arranged for some of the plural switching nodes to arrange distributively within the network.

It is desirable that the distribution modules are arranged in some of the plural switching nodes to control distributively every broadcast channels and control information is transmitted and received between the switching node and the distribution module in accordance with a subscriber line signal control.

Furthermore it is desirable that a connection request from the broadcast transmission terminal or the broadcast reception terminal is performed based on a feature access code including transmission/reception identifying information and channel specifying information to realize a meet-me conference system, whereby a connection is established to a distribution module belonging to a switching node accommodating the broadcast reception terminal.

Each of said distribution modules is preferably formed of a buffer for holding input information from an input path; and a cell duplicate functioning unit for duplicating cells by the number of that of necessary output paths in response to an output from the buffer. The cell duplicate functioning unit includes a distribution identification (ID) conversion table for storing distribution ID information retrieved in accordance with an input virtual call identifier (VCI), and a distribution ID output/VCI conversion table for storing output VCIs which are retrieved in accordance with a distribution ID in the distribution ID conversion table, whereby the cell duplicate functioning unit searches the distribution ID output/VCI conversion table to obtain a corresponding output VCI and transmits duplicate information to the output path.

Moreover permanent virtual connection lines can be preset respectively between the broadcast transmission terminal and the switching node, between the broadcast reception terminal and the switching node, between confronting switching nodes, and between the distribution module and the switching node, whereby the permanent virtual connection lines are connected using the switching node to realize a broadcast service to the broadcast reception terminal from the broadcast transmission terminal via a switching node with a distribution module.

In this case, bands can be allocated to said permanent virtual connection lines when a broadcast service is started.

The switching node is connected to a miscellaneous device, whereby the switching node sets each of the permanent virtual connection lines, based on a connection setting information from the miscellaneous device, and a broadcast service control device connected to said switching node for determining a connection configuration of the broadcast service, whereby the switching node sets a permanent virtual connection line in accordance with a command from the broadcast service control device when a broadcast service is started.

According to the above structures, an ATM broadcast service switching control system can be provided which has a reduced number of connection paths between switching nodes and can receive arbitrarily, freely and selectively broadcast programs from a broadcast reception terminal.

Since a permanent virtual connection line is previously established between a broadcast transmission terminal and a distribution module, between a broadcast reception terminal and a transmission node, and between confronting switching nodes, a broadcast service can be realized without processing a complicated signal control for a talking path setting, thus resulting in a realization and high reliability of the broadcast service system.

DESCRIPTION OF THE PREFERRED EMBODIMENTS

Referring to the attached drawings, an explanation will be made in detail as for preferred embodiments of the broadcast service system according to the present invention.

(a) Explanation of the First Embodiment

Figure 1:
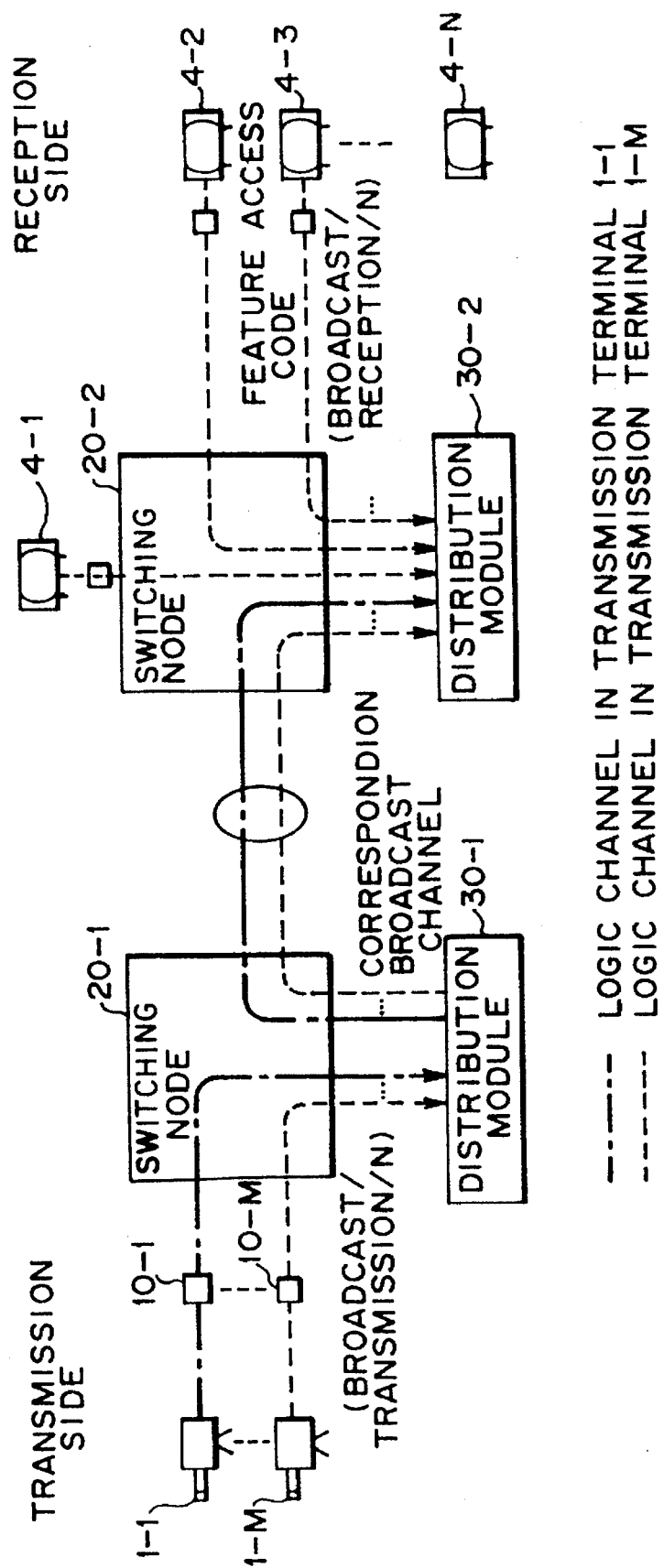
FIG. 1 is a block diagram showing a first embodiment of the present invention.
Figure 14:
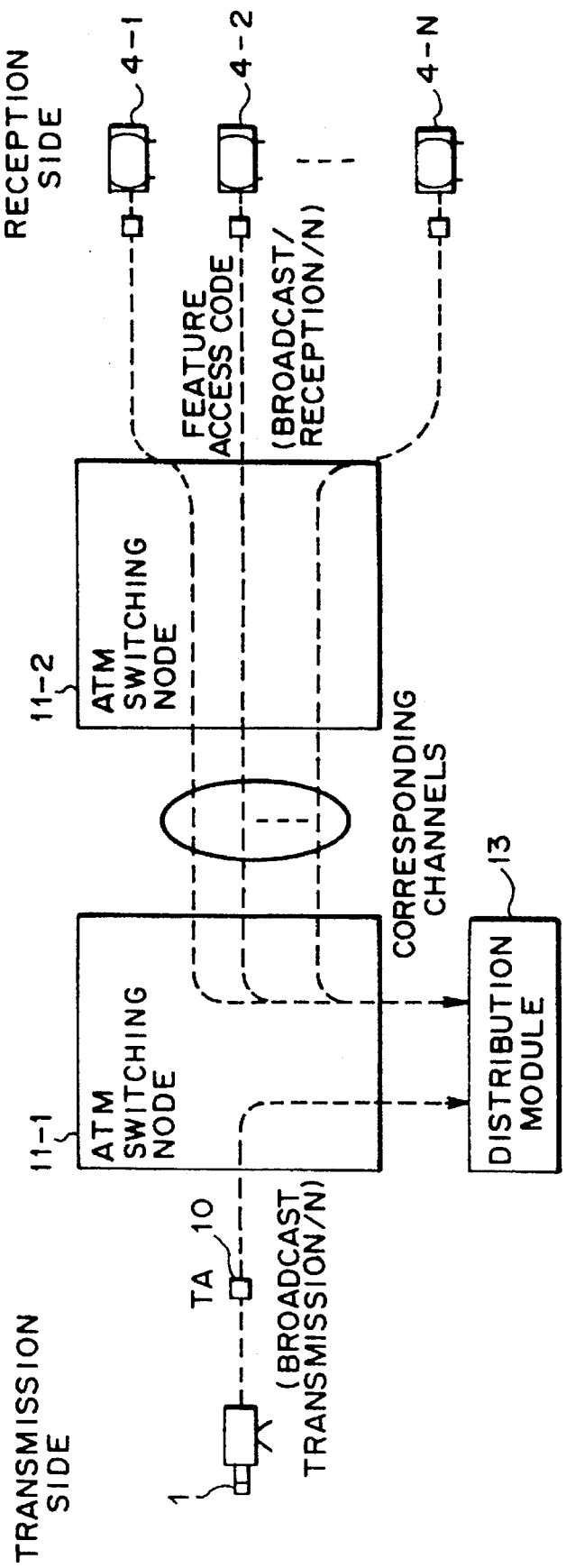
FIG. 14 is a diagram showing an embodiment of the broadcast service system using distribution modules.

FIG. 1 is a block diagram showing the first embodiment of the present invention. Referring to FIG. 1, like numerals represent elements similar to those shown in FIG. 14. In FIG. 1, numerals 1—1 to 1-M represent broadcast transmission terminals (for example, TV cameras), 4-1 to 4-N represent broadcast reception terminals (for example, TVs), and 20-1 to 20-2 represent ATM switching nodes (or ATM exchanges) connected between the broadcast transmission terminals 1-$j$ ($j$=1~M where M is a natural number) and the broadcast reception terminal 4-$i$. The numeral 10-$j$ represents a terminal adapter (TA) for converting the output of the broadcast transmission terminal 1-$j$ into an ATM cell. These elements constitute a broadcast service system. The distribution modules 30-1 and 30-2 are connected respectively to the switching nodes 20-1 and 20-2 to execute a distribution control of input path information to respective broadcast channels.

In this embodiment, the distribution modules 30-1 and 30-2 are defined as external devices for the switching nodes 20-1 and 20-2. The control information is transmitted and received between the distribution modules 30-1 and 30-2 acting as external devices and the switching nodes 20-1 and 20-2, based on the subscriber line signal control (for example, S/T point interface). Hence the switching nodes 20-1 and 20-2 can regard the distribution modules 30-1 and 30-2 as a single ISDN terminal, thus simplifying the access control.

FIG. 1 shows that a broadcast (image information) is made from the broadcast transmission terminal 1-$j$ arranged to the switching node 20-1 to the broadcast reception terminal (TV) 4-$i$ arranged to the switching node 20-2 during the exchanging period. In this case, first, the broadcast reception terminals 4-$i$ specifies a feature access code showing broadcast information/receiving information/channel N, according to the meet-me system described later. The specified feature access codes are inputted to the switching nodes 20-2. The switching node 20-2 has access to the distribution module 30-2 to prepare that an image signal for the broadcast reception terminal is communicated to the broadcast reception terminal 4-$i$.

When the broadcast transmission terminal 1-$j$ starts broadcasting, the image information converted into an ATM cell by the terminal adapter 10-$j$ is inputted to the switching node 20-1. The switching node 20-1 transmits the image information signal received in the distribution module 30-1 externally added to the exchange switch.

Figure 4:
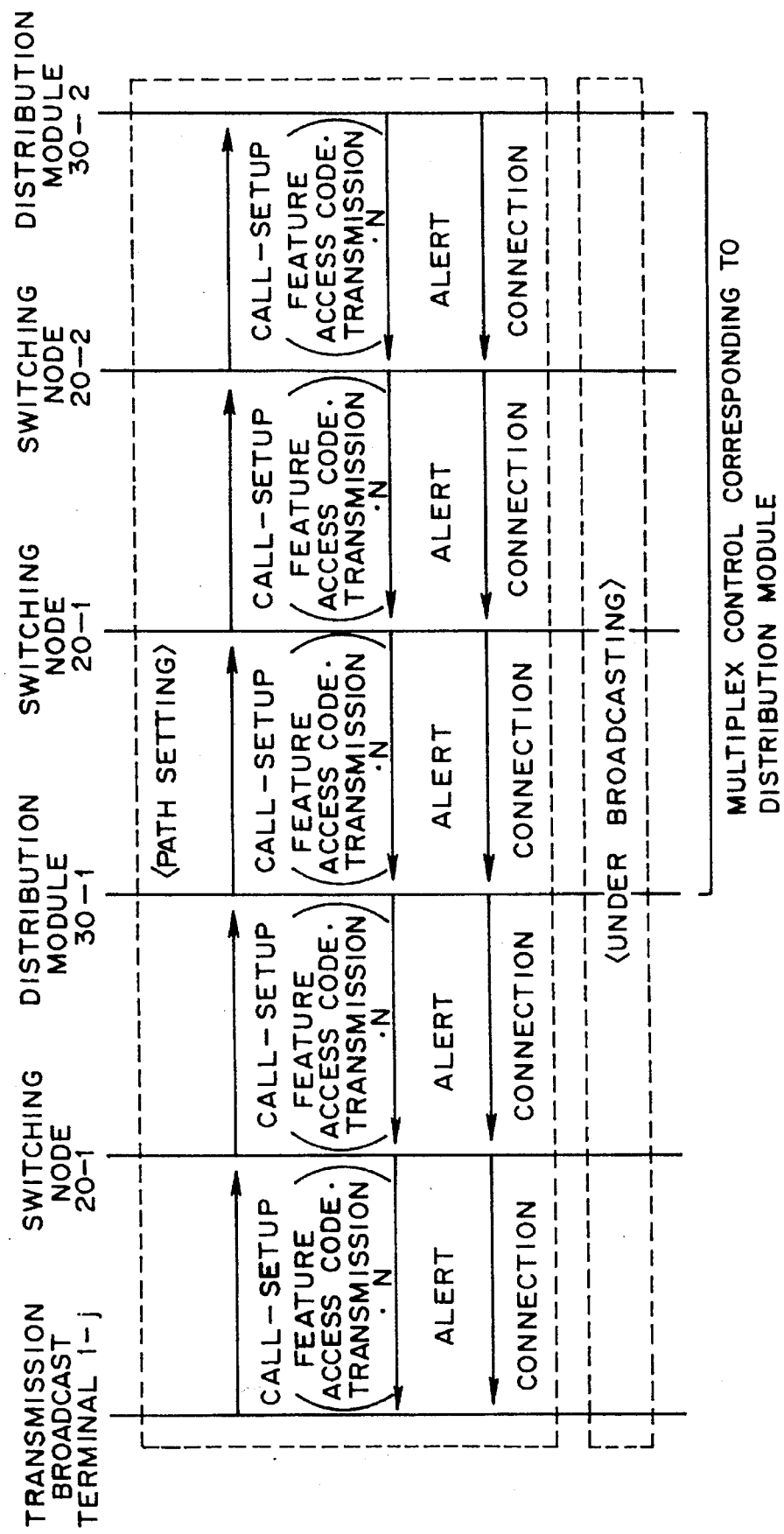
FIG. 4 is a signal sequence diagram for broadcasting from a broadcast transmission terminal to a broadcast reception terminal.

In the transmission lines between the switching nodes 20-1 and 20-2, a transmission path is activated every time when the originating terminal (here, broadcast transmission terminal 1-$j$) makes a broadcast request. Then FIG. 4 shows the signal sequence when broadcasting is made from the broadcast transmission terminal 1-$j$ to the broadcast reception terminal 4-$i$.

Figure 5:
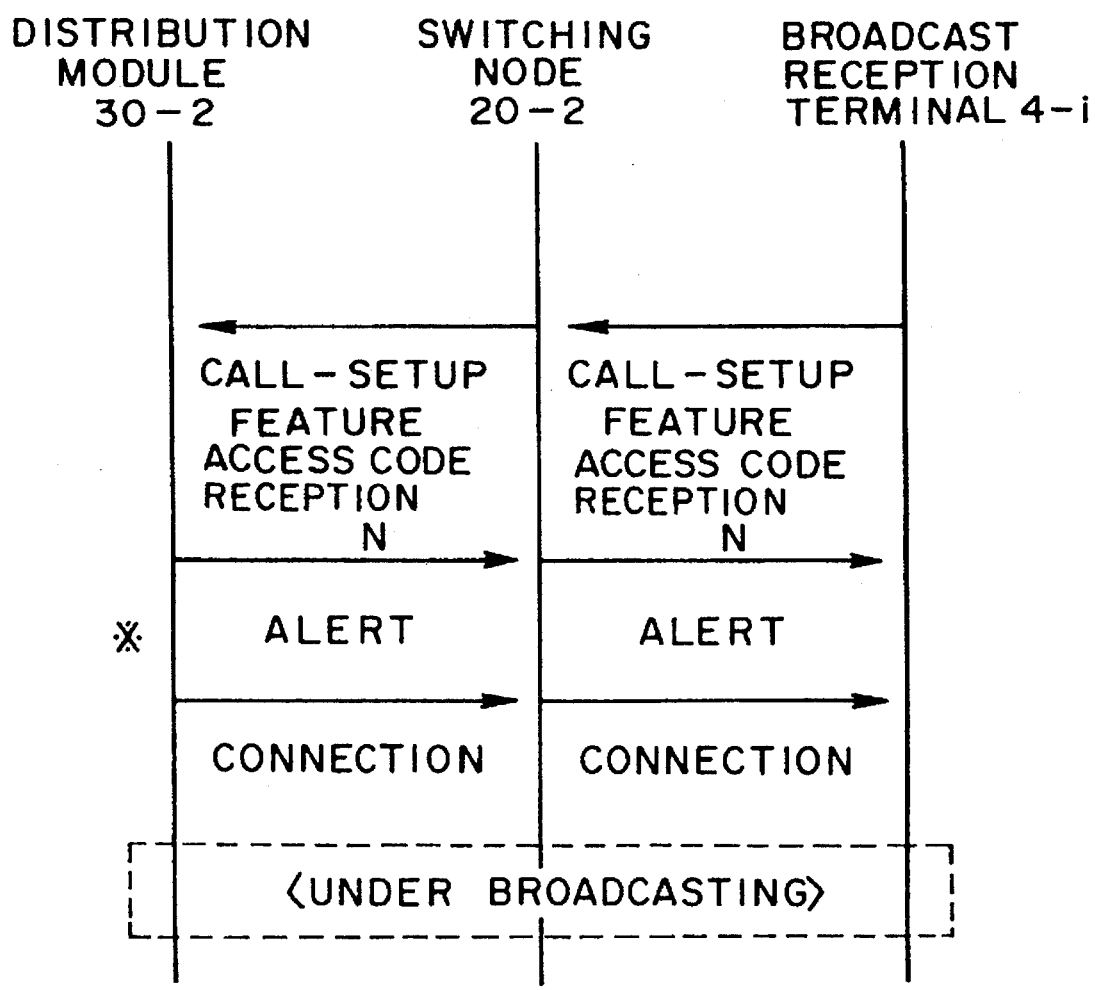
FIG. 5 is the signal sequence diagram for the meet-me system.

In such a manner, the image information transmitted from the switching node 20-1 to the switching node 20-2 is provided to the broadcast reception terminal 4-$i$ via the distribution module 30-2. The image information is provided according to the meet-me system. This signal sequence is shown in FIG. 5.

According to the present broadcast service system, the broadcast reception terminal 4-$i$ is not required to have access to the switching node 20-1. A broadcast of a desired channel can be received by having access to the distribution module 30-2 through the switching node 20-2 connected to the self terminal. Hence the number of the transmission routes (paths) between the switching nodes 20-1 and 20-2 is satisfied with only the number of broadcasting channels, whereby a simplified configuration can be made.

Figure 2:
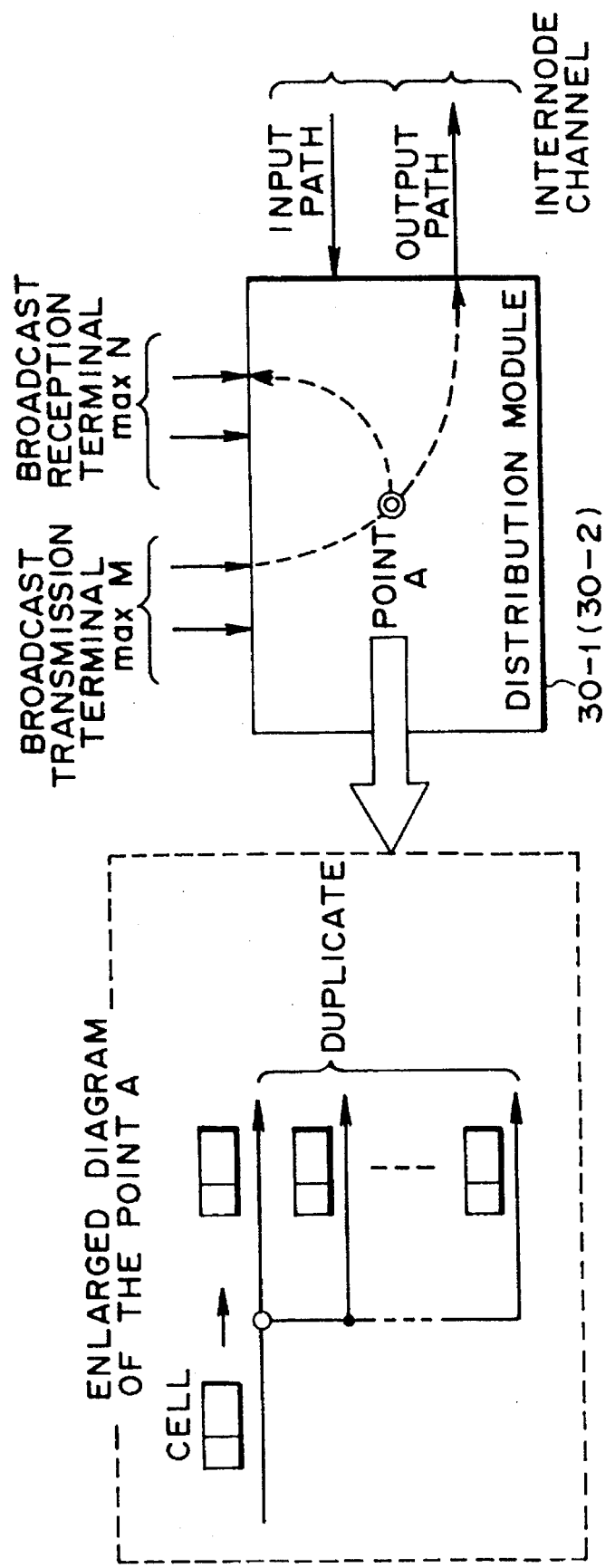
FIG. 2 is an explanatory diagram of the meet-me system.

FIG. 2 is an explanatory diagram of a meet-me system being a kind of the distribution connection system. The input path inputted to the distribution module 30-1 is an input path viewed from the switching node 20-1 from the broadcast transmission terminal 1-$j$ in FIG. 1, and an input path inputted to the distribution module 30-2 is an input path viewed from the switching node 20-2 to the switching node 20-1. The output side of the path indicates an output path to the switching node 20-2 viewed from the switching node 20-1.

The plural paths are prepared for the paths extending from the broadcast transmission terminal 1-$j$ to the distribution module 30-1 and can transmit simultaneously broadcasts from M terminals at maximum. The paths from the broadcast reception terminals 4-$i$ to the distribution module 30-2 can receive simultaneously the broadcasts from N terminals at maximum. The distribution modules 30-1 and 30-2 act as a terminal function of the communication path. That is, at a broadcasting time, the distribution modules 30-1 and 30-2 function respectively as an distant terminal for the broadcast transmission terminals 1-$j$, and also function as a broadcast transmission source to the reception terminal 4-$i$.

This means that the broadcast transmission terminal 1-$j$ and the broadcast reception terminal 4-$i$ can be connected to each other by watching only the broadcast channel number, without considering a distant terminal (meet-me system). The distribution module 30-1 transmits image information to another switching node to send an arbitrary broadcast program from the broadcast transmission terminal 1-$j$. The distribution module 30-2 transmits image information to the broadcast reception terminal 4-$i$ when a broadcast channel is arbitrarily selected from the broadcast reception terminal 4-$i$.

The enlarged diagram of the point A in the distribution module 30-1 or 30-2 shows that when an ATM cell is copied by an arbitrary number of addresses when the same image information is transmitted to plural addresses.

Figure 3:
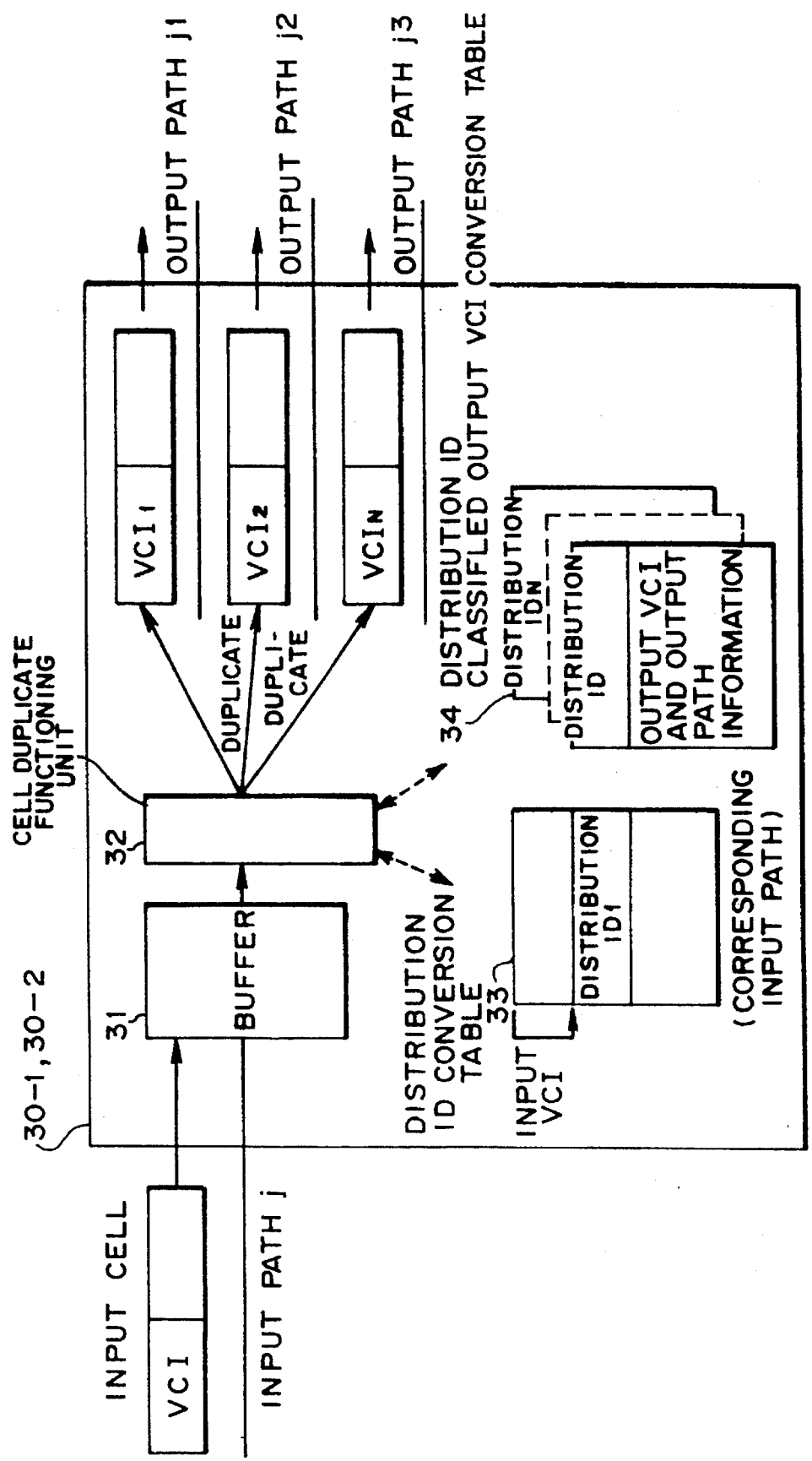
FIG. 3 is an explanatory diagram of the channel distribution control system.

FIG. 3 is an explanatory diagram for a channel distribution control system performed in the distribution modules 30-1 and 30-2. Like numerals represent similar elements to those shown in FIG. 1. Referring to FIG. 3, numeral 31 represents a buffer for holding input information from the input path j corresponding to the broadcast transmission terminal 1-$j$, and 32 represents a cell duplicate functioning unit for receiving the output of the buffer 31. Numeral 33 represents a distribution ID conversion table storing distribution ID information retrieved by the input VCI (virtual channel identifier), and 34 represents a distribution ID output/VCI conversion table storing the output VCI retrieved in accordance with the ID information in the distribution ID conversion table 33. The distribution ID conversion table 33 is connected to the distribution ID output/VCI conversion table 34 by the cell duplicate functioning unit 32.

The distribution modules 30-1 and 30-2 constructed thus copy and distribute inputted cell information to the communication path defined by a connection request or to a distribution module of another switching node.

The input path j includes one from a self node accommodating terminal or one transferred from another node. The selection and judgment are determined in accordance with a transmission connection request from the broadcast transmission terminal 1-$j$. Likewise, the output path (shown with j1 to j3 in figure) includes one to self node accommodating terminal and one to be transferred to another node, and the output path to the terminal is determined according to the receiving connection request.

The cell copying function realized by the cell duplicate functioning unit 32 is performed to the output path corresponding to each of the input path j. The distribution ID conversion table 33 is retrieved according to the input VCI for each input path. Then the distribution ID classified output VCI conversion table 34 is retrieved based on the resultant distribution ID, and the obtained output VCI is outputted to the output path.

Thereafter, when broadcasting is started from the broadcast transmission terminal 1-$j$, an image information is inputted to the distribution modules 30-1 and 30-2 to store in the buffer 31 within the distribution module. The cell duplicate functioning unit 32 reads image information stored in the buffer 31, and converts and copies the corresponding output VCI according to the content of the distribution ID conversion table 33 and the distribution ID classified output VCI conversion table 34 to transmit to the corresponding output sides.

Figure 6:
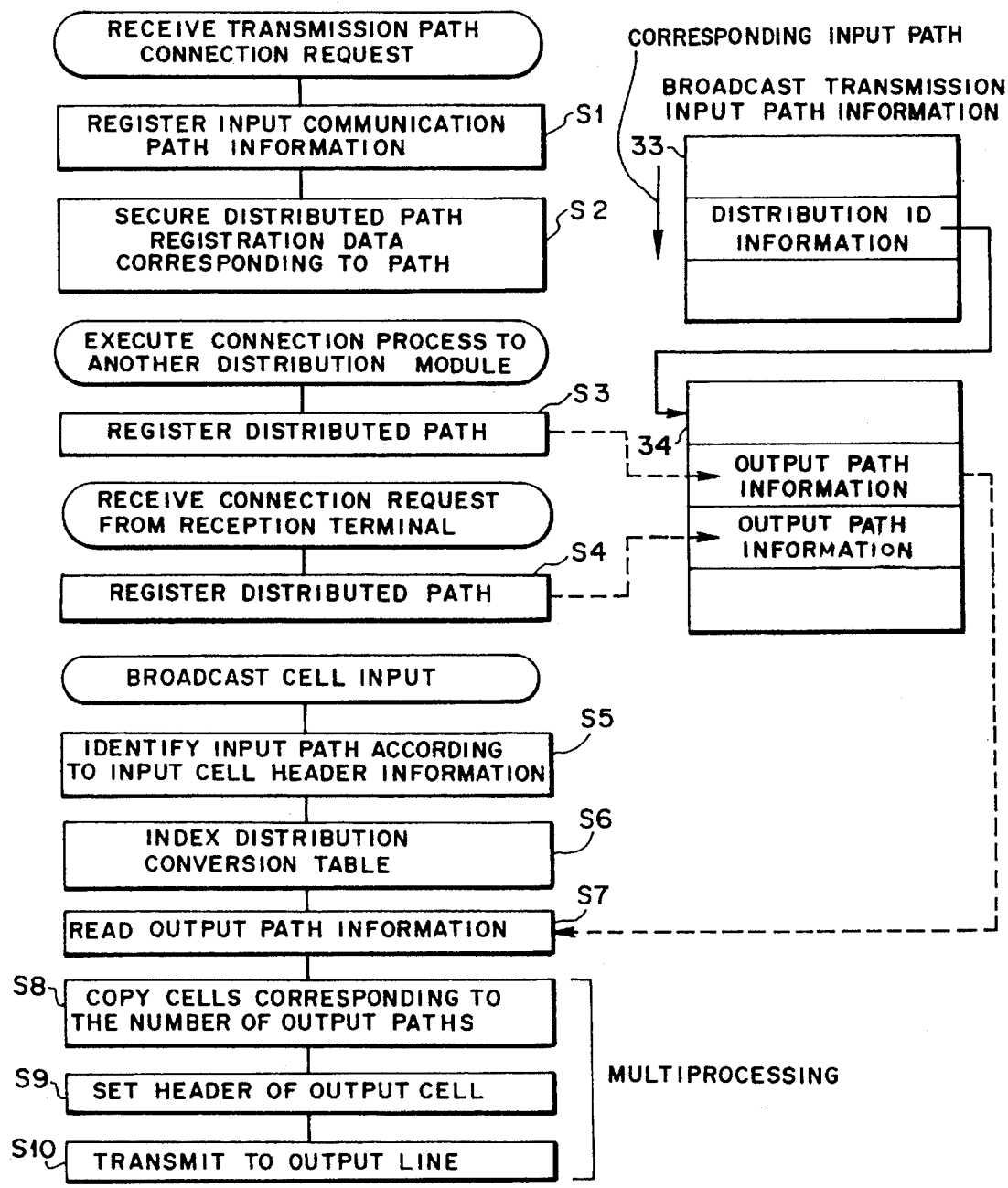
FIG. 6 is the process flowchart for the channel distribution control system.

The processing flow is shown in FIG. 6. That is, as shown in FIG. 6, when a transmission path connection request is received, input path information is registered first (step S1) and then a distribution path registration data corresponding to a path is ensured (step S2). When a connection process to another distribution module is performed or a connection request from a broadcast reception terminal is received, the distribution address path is registered (steps S3 and S4), whereby a control information setting process is completed.

When a broadcast cell is inputted at a cell copying process, the input path is recognized by the header information of the input cell (step S5). Then a distribution conversion table (the distribution ID conversion table 33 and the distribution ID classified output VCI conversion table 34) is retrieved (step S6). The output information is read out (step S7). The cells corresponding to the number of output paths are copied and then the corresponding output lines are transmitted after the header of the output cell is set (steps S8 to S10).

In the above mentioned manner, the distribution modules 30-1 and 30-2 arranged respectively in the switching nodes 20-1 and 20-2 are arranged as external devices. Communication between the distribution modules is performed through one channel (signal line) per broadcast channel. The broadcast reception terminal 4-$i$ has access to the nearest switching node 202 to notify the feature access code specifying broadcasting/receiving/specified channel N to the switching node 20-2 by utilizing the meet-me system. Thus the switching node 20-2 can have access to the distribution module 30-2 connected to the self terminal to provide information of a target broadcast channel to the broadcast reception terminal 4-$i$. Hence an ATM broadcast service switching control system can be provided which has a small number of connection paths between the switching nodes and can receive selectively, arbitrarily, and freely a broadcast content from a broadcast reception terminal.

(b) Explanation of the Second Embodiment

Figure 7:
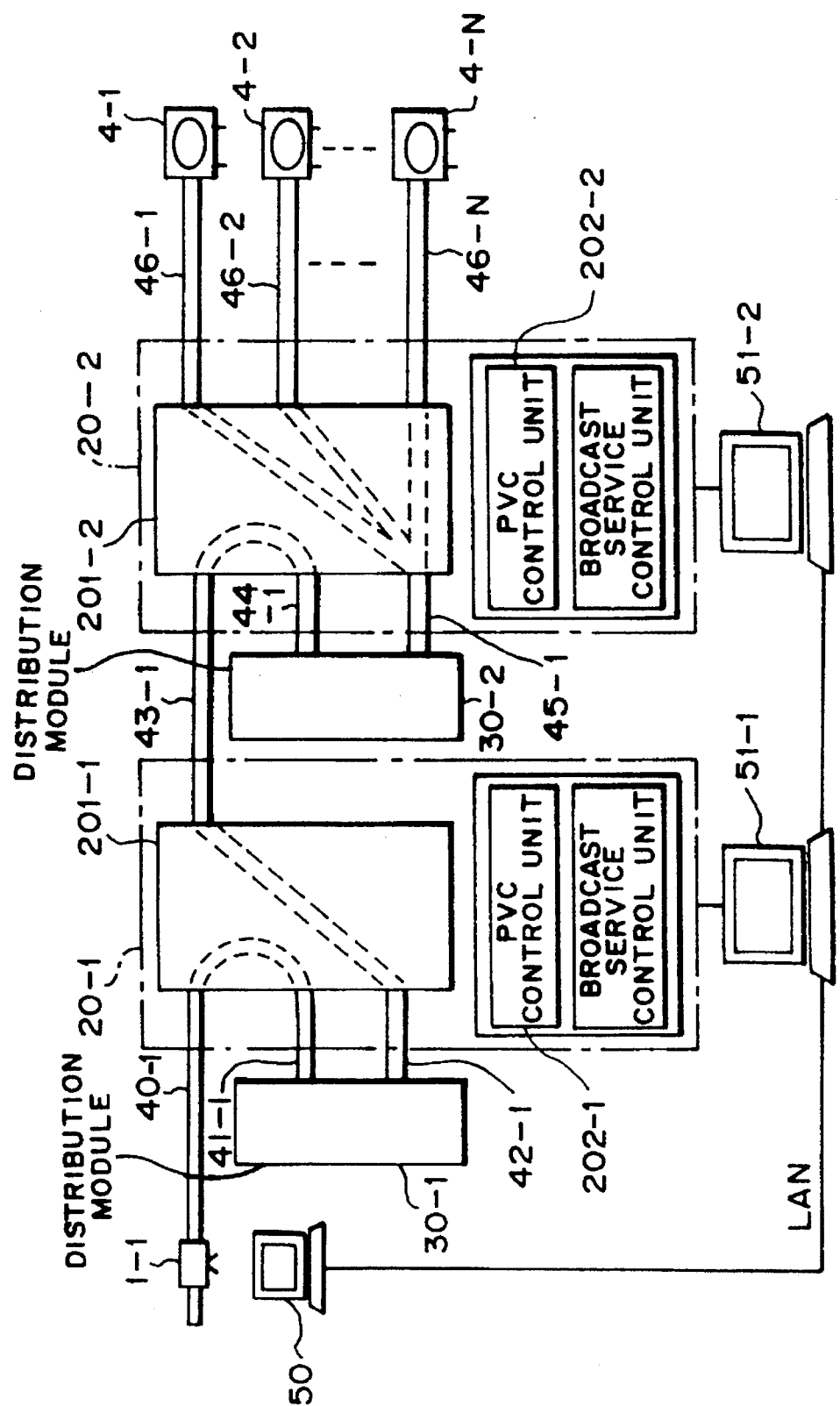
FIG. 7 is a block diagram showing the second embodiment of the present invention.

FIG. 7 is a block diagram showing the second embodiment according to the present invention. According to the second embodiment, permanent virtual connection lines (PVC lines) 40-1, 41-1, 42-1, 43-1, 44-1, 45-1, and 46-$i$ are preset between the broadcast transmission terminal 1-1 and the ATM switching node 20-1, between broadcast reception terminal 4-$i$ and the ATM switching node 20-2, the confronting ATM switching nodes 20-1 and 20-2, and between the distribution modules 30-1 and 30-2 and the switching nodes 20-1 and 20-2. Thus the switching units 201-1 and 201-2 in the ATM switching nodes 20-1 and 20-2 are connected to each PVC line at the broadcast service starting time so that a broadcast service can be realized from the broadcast transmission terminal 1-1 to the broadcast reception terminal 4-i through switching nodes 20-1 and 20-2 with distribution modules 30-1 and 30-2.

When the PVC line is set between the broadcast transmission terminal 1-1 and the ATM switching node 20-1, a predetermined logical channel (a part of a bunch of logical channels) is allocated as a private transmission line. When a PVC line is set between the broadcast reception terminal 4-$i$ and the ATM switching node 20-2, a predetermined logical channel (a part of a bunch of logical channels) is allocated as a private receiving channel. When the PVC line is set between the ATM switching nodes 20-1 and 20-2, a predetermined logical channel (a part of a bunch of logical channels) is allocated as a broadcast communication-only channel. When the PVC lines are set between the distribution modules 30-1 and 30-2 and the switching nodes 20-1 and 20-2 a predetermined logical channel (a part of a bunch of logical channels) is allocated.

When the PVC line is set between the ATM switching nodes 20-1 and 20-2, the number of channels are determined in consideration of the simultaneous broadcast traffic volume.

In this case, a necessary band is preset for broadcasting, but it may be allocated to each PVC line when the broadcast service is started.

Furthermore, in this embodiment, the work station 50 acting as a miscellaneous device is connected to the switching node 20-1 to input connection setting information via the work station 50. The PVC control units 202-1 and 202-2 in the switching nodes 20-1 and 20-2 set each PVC line, based on the connection setting information from the work station 50.

In this case, the broadcast service control devices 51-1 and 51-2 are connected to the switching nodes 20-1 and 20-2. The broadcast service connection structure is determined when the broadcast service control devices 51-1 and 51-2 receive connection setting information via, for example, LANs. When the broadcast service is started, the switching nodes 20-1 and 20-2 are set each PVC line in response to commands from the broadcast service control devices 51-1 and 51-2.

Figure 8:
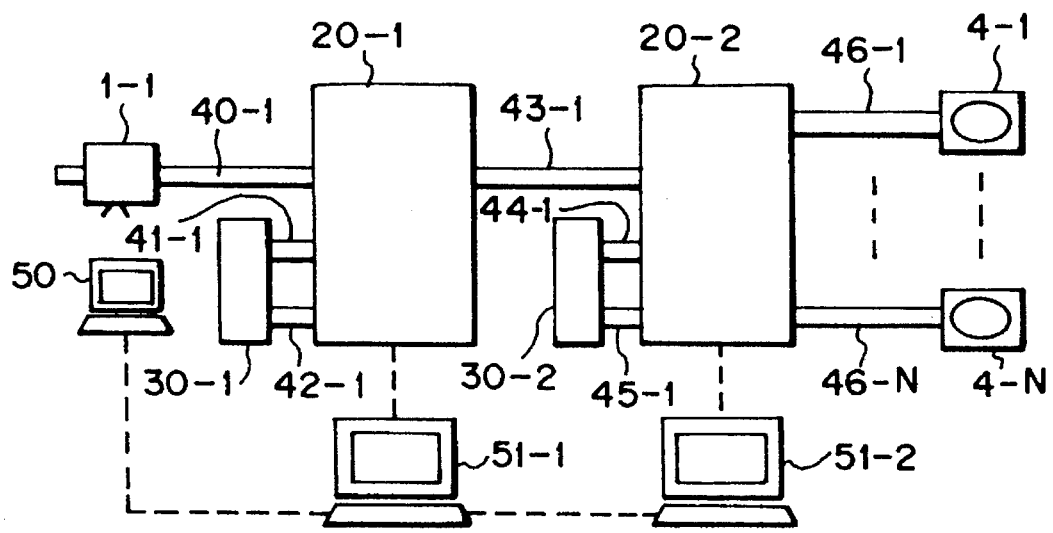
FIG. 8 is a diagram explaining a permanent virtual connection path at broadcasting.

Thus the work station 50 inputs address information (including reception terminal information to be connected or switching node information) to set a connection of the broadcast service. The address information inputted is transmitted to the ATM switching nodes 20-1 and 20-2 via the broadcast service control devices 51-1 and 51-2. In the ATM switching nodes 20-1 and 20-2, the PVC control units 202-1 and 202-2 are activated to set the PVC line based on the inputted address information (refer to FIG. 8)

Figure 9:
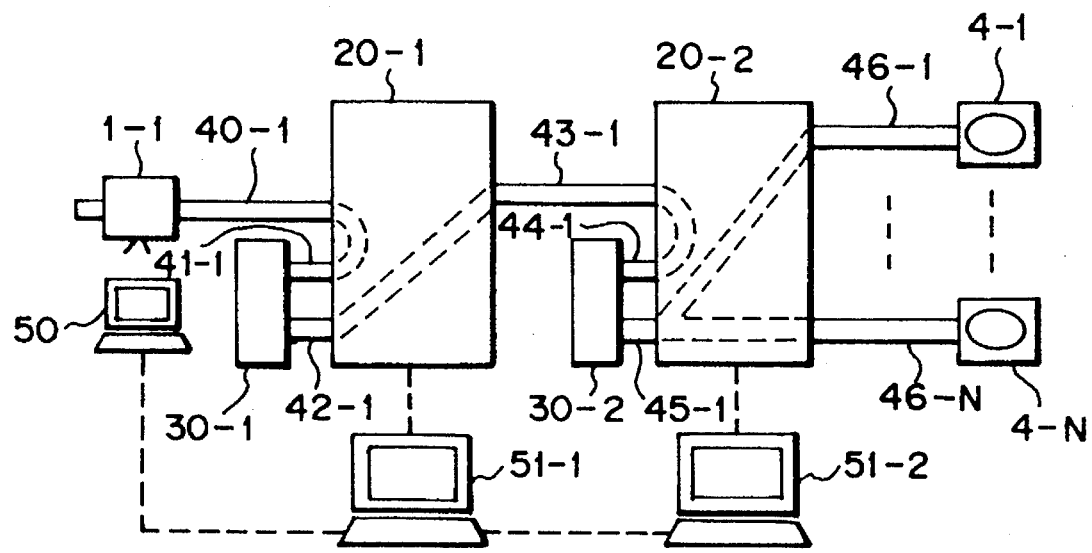
FIG. 9 is a diagram explaining a permanent virtual connection path at broadcasting.

Thereafter, when the broadcast service is started, the ATM switching nodes 20-1 and 20-2 ensure a band in the PVC line. The switching units 201-1 and 201-2 connect between PVC lines to set a broadcast reception channel (refer to FIG. 9).

As described above, a broadcast transmitted from the broadcast transmission terminal 1-1 is transmitted to the broadcast reception terminal 4-$i$ via the set channel, whereby a broadcast service is realized.

Since the other structures and operations are similar to those in the first embodiment, the explanation will be omitted here.

The second embodiment can provide similar effect to that of the first embodiment. A broadcast connection can be set by using connection setting information from the work station 50 as distant address information needed for a broadcast and without receiving it as signal information from an actual broadcast terminal, without using any signal control (in this case, the broadcast transmission terminal 1-1).

(c) Explanation of the Third Embodiment

Figure 10:
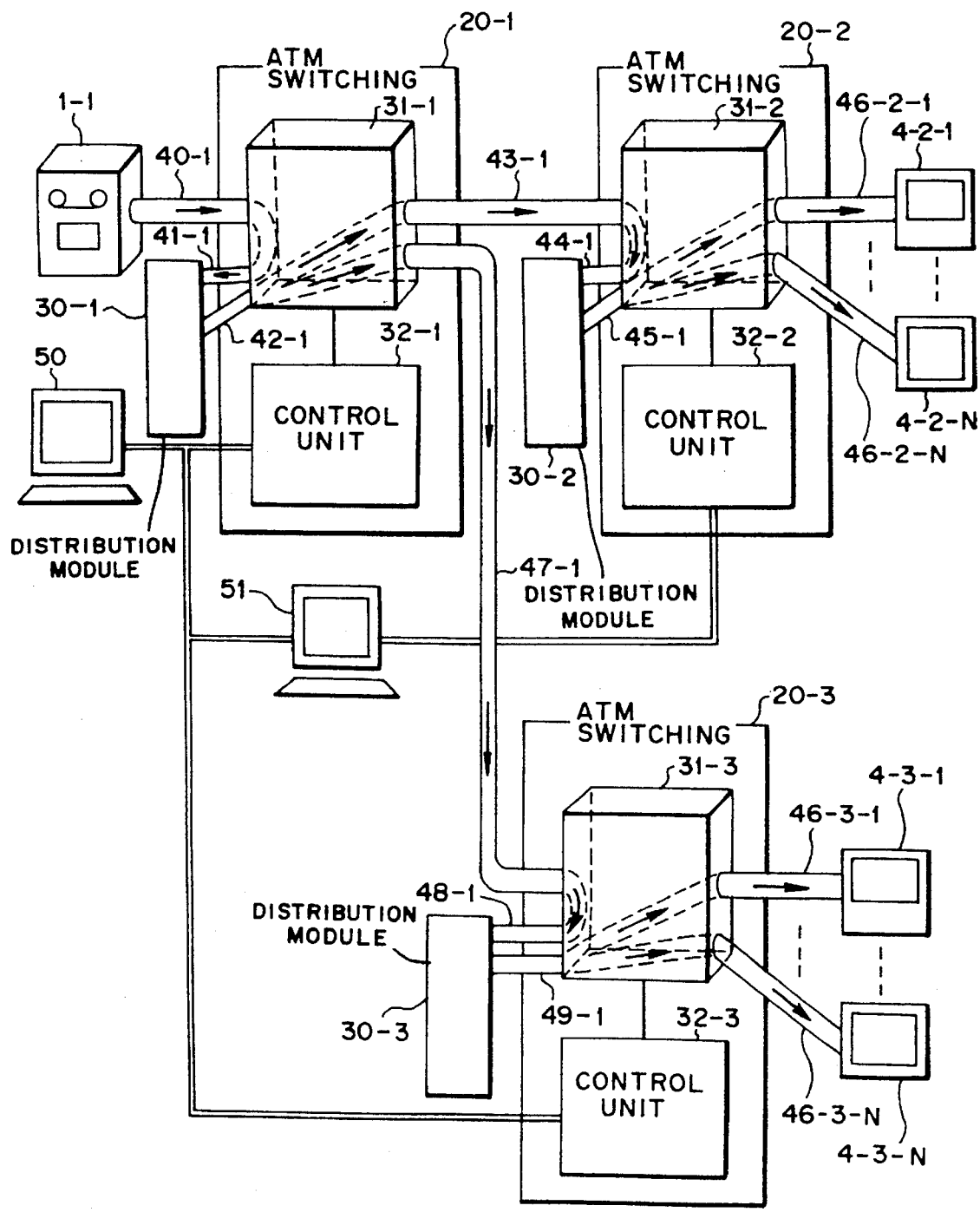
FIG. 10 is a diagram showing the third embodiment according to the present invention.

FIG. 10 is a block diagram showing the third embodiment according to the present invention. FIG. 10 shows a broadcast service system including an ATM exchange which is constituted of three ATM switching nodes 20-1, 20-2, and 20-3.

The ATM switching nodes 20-1, 20-2, and 20-3 are provided respectively with distribution modules 30-1, 30-2, and 30-3 as external circuit. The ATM switching nodes 20-1, 20-2, and 20-3 also include respectively switching units 31-1, 31-2, and 31-3 and control units 32-1, 32-2, and 32-3. The ATM switching node 20-1 accommodates a broadcast transmission terminal 1-1. The ATM switching node 20-2 accommodates a broadcast switching node 4-2-$i$. The ATM switching node 20-3 accommodates a broadcast reception terminal (for example, TV) 4-3-$i$. The work station 50 acting as a miscellaneous device inputs terminal address information.

Furthermore, the broadcast service control device 51 has information on the terminals 4-2-$i$, and 4-3-$i$ accommodated in ATM switching nodes 20-1, 20-2, and 20-3 in the ATM switching network, and information on PVC lines between switching nodes.

In the above configuration, the work station 50 notifies the broadcast service control device 51 of address information for setting a broadcast service connection. The broadcast service control device 51 retrieves ATM exchanges 20-2 and 20-3 accommodating the broadcast reception terminals 4-2-$i$, and 4-3-$i$, based on inputted address information. Thus the broadcast service control device 51 commands the ATM switching nodes 21-1, 21-2, and 21-3 so as to set the PVC lines 40-1, 41-1, 42-1, 43-1, 44-1, 45-1, 47-1, 48-1, 49-1, 46-2-$i$, and 46-3-$i$ between the broadcast transmission terminal 1-1 and the ATM switching node 20-1, between the broadcast reception terminals 4-$i$ and 5-$i$ and the ATM switching nodes 20-2 and 20-3, between the confronting ATM switching nodes 20-1, 20-2, 20-1 and 20-3, and between distribution modules 30-1, 30-2 and 30-3 and the switching nodes 20-1, 20-2 and 20-3. The ATM switching nodes 20-1, 20-2 and 20-3 set the PVC lines in accordance with the command, respectively.

Moreover, when a broadcast service is started, each of the ATM switching nodes 20-1, 20-2 and 20-3 ensures a band needed for a broadcast within its PVC line. The PVC line is connected using the switching units 31-1, 31-2, and 31-3 to set a broadcast channel.

As described above, a broadcast transmitted from the broadcast transmission terminal 1-1 is transmitted to the broadcast reception terminals 4-2-$i$ and 4-3-$i$ through the preset communication channels, whereby a broadcast service is realized.

In the third embodiment, since the other structure and operation is similar to those of the first embodiment, the explanation will be omitted here.

As described above, the third embodiment can provide a similar effect to that in the first embodiment. Moreover since the broadcast service control device 51 determines a connection configuration for communication channels needed for a broadcast service, a broadcast service can be realized without compricatedly processing signals to set a channel between ATM exchanges.

The broadcast control device 51 manages comprehensively the PVC line in ATM network and can select easily an optimum route for a communication channel, thus leading to high reliability of the broadcast service.

(d) Explanation of the Fourth Embodiment

Figure 11:
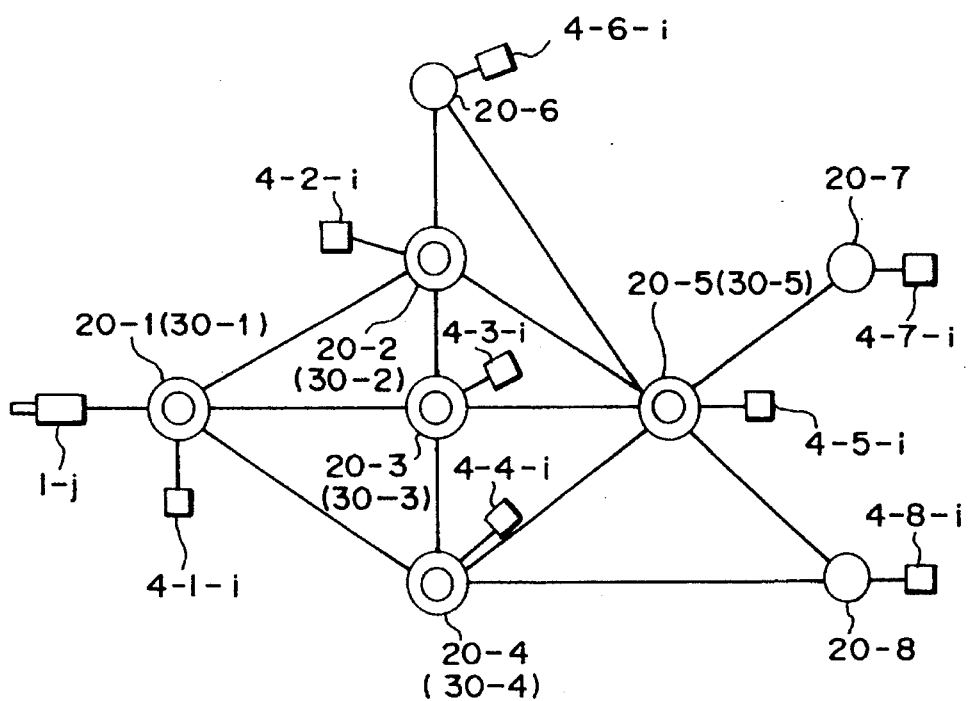
FIG. 11 is a diagram showing the fourth embodiment according to the present invention.
Figure 12:
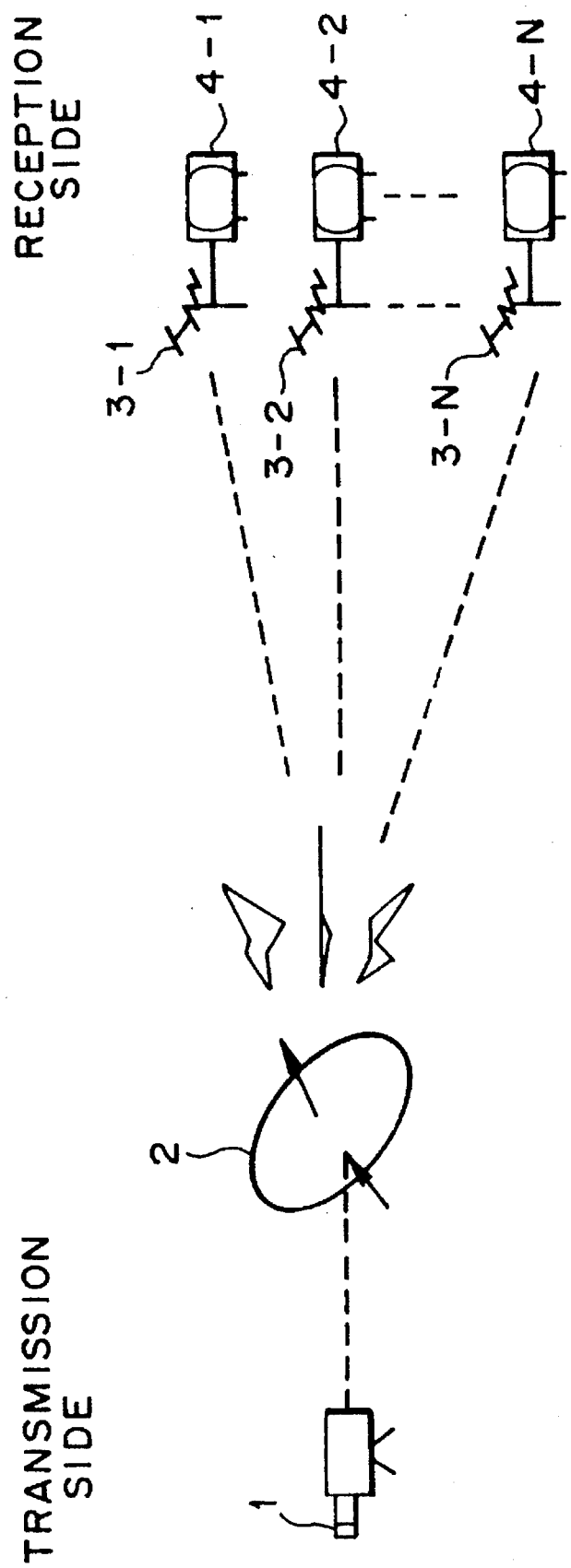
FIG. 12 is a diagram showing the first embodiment according to the conventional broadcast service system.
Figure 13:
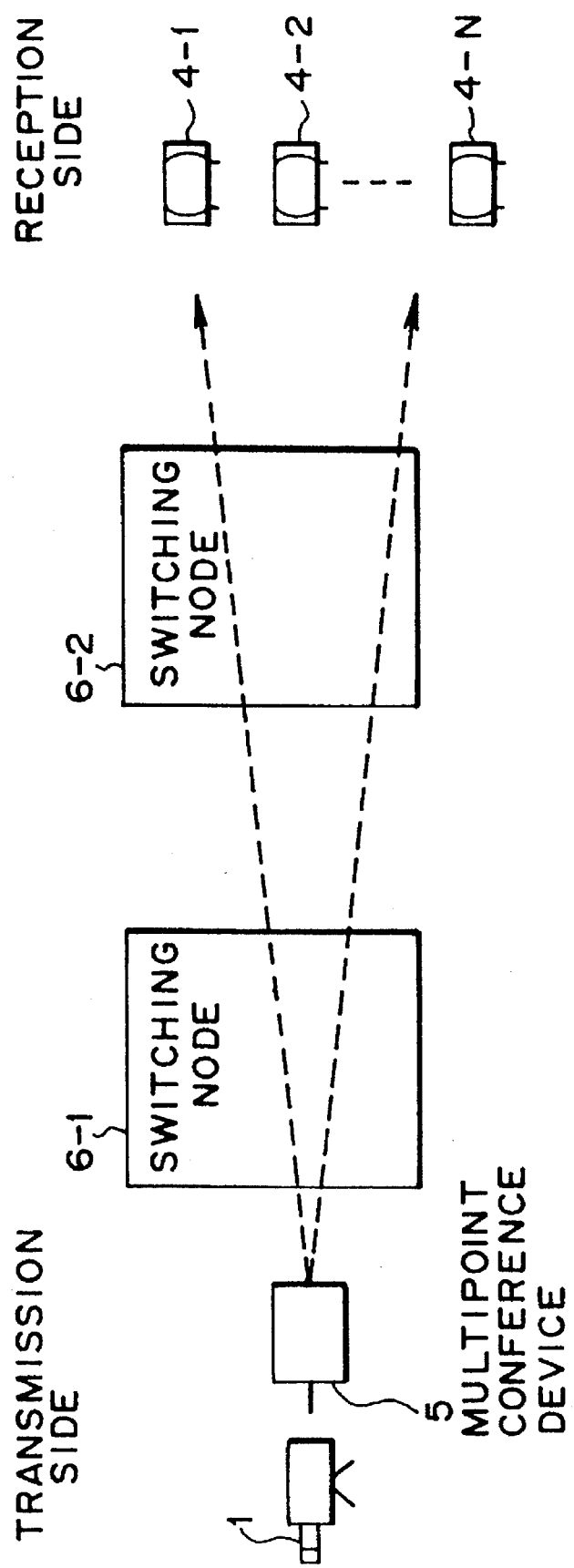
FIG. 13 is a diagram showing the second embodiment according to the conventional broadcast service system.

FIG. 11 is a block diagram showing the fourth embodiment of the present invention. According to the fourth embodiment, the broadcast service system, where the broadcast transmission terminal 1-$i$ is connected to the broadcast reception terminal 4-$k$-$i$ ($k$=1~K where K is a natural number) through a network having a large number of ATM switching nodes 20-$k$, executes a distribution control of input information and includes plural (P<K-1) distribution modules 30-$p$ ($p$=1~p where p is a natural number) used as external circuits of the exchange switches in the switching nodes. The distribution modules 30-p are added to the switching nodes 30-1 to 30-P being part of the large number of switching nodes 30-1~30-K to arrange distributively in the network.

The distribution module 30-$p$ for controlling distributively every broadcast channel is arranged in the switching nodes 30-1 to 30-P being part of the large number of switching nodes 30-1 to 30-K.

Moreover the third embodiment is similar to the first embodiment in that control information between the switching node and the distribution module added thereto is transmitted and received based on a subscriber line signal control. The third embodiment also is similar to the first embodiment in that the meet-me system is realized by performing a connection request from the broadcast transmission terminal 1-$j$ or broadcast reception terminal 4-$k$-$i$ in accordance with a feature access code including transmission/reception identification information and channel specifying information, thus connecting to the distribution module 30-1 belonging to the switching node 20-1 accommodating the broadcast reception terminal 1-$j$.

The distribution module 30-$p$ includes a buffer 31 for holding input information from the input path and a cell duplicate functioning unit 32 for duplicating cells by the number of output paths needed to receive the output from the buffer 31. The cell duplicate functioning unit 32 includes a distribution ID conversion table 33 storing distribution ID information retrieved by the input VCI, and a distribution ID output/VCI conversion table 34 storing an output VCI retrieved in accordance with a distribution ID of the distribution ID conversion table 33. Like that in the first embodiment, the cell duplicate functioning unit 32 searches the distribution ID output VCI conversion table 34 to obtain the output VCI, and duplicates it to transmit the information to the output path.

Therefore according to the broadcast service system, distribution modules are not added to all the switching nodes and the broadcast reception terminal 4-$k$-$i$ is not needed having access to the switching node 201 accommodating the broadcast transmission terminal 1-$j$. Since a broadcast of a desired channel can be received by having access to a switching node connected to a self terminal or the distribution module 30-$p$ added to a switching node near to the self terminal, the broadcast service system has a high practical value.

When an access is made to a distribution module 30-$p$ added to a switching node near to the switching node connected to the self terminal, the distribution module is selected in accordance with the traffic condition.

The PVC lines are respectively preset between the broadcast transmission terminal 1-$j$ and the switching node 20-1, between the transmission reception terminal 4-$k$-$i$ and the switching node 20-$k$, between confronting switching nodes, and between the distribution module 30-$p$ and the switching node 30-$p$. Thus a broadcast service can be realized from the broadcast transmission terminal 1-$j$ to the broadcast reception terminal 4-$k$-$i$ through the switching node 20-$p$ with a distribution module 30-$p$ by connecting each PVC line using a switching node.

In this case, a band needed for broadcasting may be set previously, or the band may be allocated to each PVC line at the start of a broadcast service.

Like the second and third embodiments, a miscellaneous device such as a work station may be connected to a switching node. The switching node may preset each PVC line based on connection setting information from the miscellaneous device. The broadcast service control device, which determines a connection configuration for a broadcast service in a switching node, may be connected to a switching node. The switching node may set each PVC line at a broadcast service start time in accordance with a command from the broadcast service control device. Hence the similar effects and advantages to those of the second and third embodiments are obtained.

(e) Other embodiment

In the foregoing embodiments, the number of broadcast transmission terminals, broadcast reception terminals, switching nodes, or distribution modules may be determined arbitrarily.

What is claimed is:

1. A broadcast service system comprising a plurality of switching nodes; a broadcast transmission terminal and a broadcast reception terminal connected to each other through said plurality of switching nodes, each switching node comprising an exchange switch, and a distribution module for controlling distributively input information and being arranged as an external circuit to the exchange switch of a respective switching node, said switching nodes and distribution modules thereof being connected such that when broadcasting begins, information is transmitted from said broadcast transmission terminal to a distribution module of the switching node on said transmission side via said switching node on said transmission side accommodating said broadcast transmission terminal, the distribution module of the switching node on said transmission side copying said information, the copied information being transmitted from said distribution module of the switching node on said transmission side to the distribution module of said switching node on said reception side via said switching node on said reception side accommodating said broadcast reception terminal, said information being accessed from said broadcast reception terminal to said distribution module on said reception side via said switching node on said reception side.

2. A broadcast service system according to claim 1, wherein a distribution module of each of said plurality of switching nodes controls distributively broadcast channels.

3. A broadcast service system according to claim 1, wherein control information is transmitted and received between each of said switching nodes and distribution modules in accordance with a subscriber line signal control.

4. A broadcast service system
comprising a plurality of switching nodes; a broadcast transmission terminal and a broadcast reception terminal connected to each other through said plurality of switching nodes, each switching node comprising an exchange switch, and a distribution module for controlling distributively input information and being arranged as an external circuit to the exchange switch of a respective switching node, said switching nodes and distribution modules thereof being connected such that when broadcasting begins, information is transmitted from said broadcast transmission terminal at a transmission side to a distribution module of the switching node on said transmission side via said switching node on said transmission side, from said distribution module of the switching node on said transmission side to a distribution module of the switching node on a reception side via said switching node on said reception side accommodating said broadcast reception terminal, said information being accessed from said broadcast reception terminal to said distribution module on said reception side via said switching node on said reception side, wherein said distribution module of each switching node comprises:

a buffer for holding input information from an input path; and a cell duplicate functioning unit for duplicating cells by the number of that of necessary output paths in response to an output from said buffer;

said cell duplicate functioning unit including a distribution identification (ID) conversion table for storing distribution ID information retrieved in accordance with an input virtual call identifier (VCI), and a distribution ID output and VCI conversion table for storing output VCIs which are retrieved in accordance with a distribution ID in said distribution ID conversion table, said cell duplicate functioning unit searching said distribution ID output and VCI conversion table to obtain a corresponding output VCI and transmits duplicate information to said output path.

5. A broadcast service system comprising;

a plurality of switching nodes;

a broadcast transmission terminal and a broadcast reception terminal connected to each other through said plurality of switching nodes, each switching node comprising an exchange switch, and a distribution module for controlling distributively input information and being arranged as an external circuit to the exchange switch of a respective switching node;

said switching nodes and distribution modules thereof being connected such that when broadcasting begins, information is transmitted from said broadcast transmission terminal at a transmission side to a distribution module of the switching node on said transmission side, from said distribution module of the switching node on said transmission side to a distribution module of the switching node on a reception side via said switching node on said reception side accommodating said broadcast reception terminal, said information being accessed from said broadcast reception terminal to said distribution module on said reception side via said switching node on said reception side; and permanent virtual connection lines preset respectively between said broadcast transmission terminal and said switching node on said transmission side, between said broadcast reception terminal and said switching node on said reception side, between confronting switching nodes, and between each distribution module and a corresponding switching node wherein said permanent virtual connection lines are connected using said switching node to realize a broadcast service to said broadcast reception terminal from said broadcast transmission terminal via a switching node with a distribution module.

6. A broadcast service system according to claim 1, wherein a connection request from said broadcast transmission terminal or said broadcast reception terminal is performed based on a feature access code including transmission or reception identifying information and channel specifying information to realize a meet-me system, wherein a connection is established to a distribution module of a switching node accommodating said broadcast reception terminal.

7. A broadcast service system according to claim 5, wherein band widths are allocated to said permanent virtual connection lines when a broadcast service is started.

8. A broadcast service system according to claim 5, further comprising a miscellaneous device connected to each switching node, each said switching node setting each respective one of said permanent virtual connection lines, based on a connection setting information from said miscellaneous device.

9. broadcast service system according to claim 5, further comprising a broadcast service control device connected to each switching node for determining a connection configuration of said broadcast service, said each switching node setting a respective a permanent virtual connection line in accordance with a command from said broadcast service control device when a broadcast service is started.

10. A broadcast service system wherein a broadcast transmission terminal is connected to a broadcast reception terminal through a network including plural switching nodes, comprising:

plural distribution modules for controlling distributively input information, each of said plural distribution modules being used as an external circuit to an exchange switch within each corresponding one of said switching nodes, said distribution modules being arranged to some of said plural switching nodes to arrange distributively within said network, wherein when broadcasting begins, information is transmitted from said broadcast transmission terminal to a distribution module on a transmission side arranged to a switching node on said transmission side via said switching node on said transmission side accommodating said broadcast transmission terminal, the distribution module on said transmission side copying said information, the copied information being transmitted from said distribution module on said transmission side to said distribution module of the switching node on said reception side via said switching node on said reception side accommodating said broadcast reception terminal, said information being accessed from said broadcast reception terminal to said distribution module on said reception side via said switching node on said reception side.

11. A broadcast service system according to claim 10, wherein said distribution modules control distributively every broadcast channel.

12. A broadcast service system according to claim 10, wherein control information is transmitted and received between each switching node and a corresponding distribution module in accordance with a subscriber line signal control.

13. A broadcast service system according to claim 10, wherein a connection request from said broadcast transmission terminal or said broadcast reception terminal is performed based on a feature access code including transmission/reception identifying information and channel specifying information to realize a meet-me system, wherein a connection is established to a distribution module belonging to a switching node accommodating said broadcast reception terminal.

14. A broadcast service system wherein a broadcast transmission terminal is connected to a broadcast reception terminal through a network including plural switching nodes, comprising:

plural distribution modules for controlling distributively input information, each of said plural distribution modules being used as an external circuit to an exchange switch within each corresponding one of said switching nodes, said distribution modules being arranged to some of said plural switching nodes to arrange distributively within said network, wherein when broadcasting begins, information is transmitted from said broadcast transmission terminal to a distribution module on a transmission side arranged to a switching node on said transmission side via said switching node on said transmission side accommodating said broadcast transmission terminal, from said distribution module on said transmission side to a distribution module arranged to a switching node on said reception side via said switching node on said reception side accommodating said broadcast reception terminal, said information being accessed from said broadcast reception terminal to said distribution module on said reception side via said switching node on said reception side, and wherein each of said distribution modules comprises:

a buffer for holding input information from an input path; and a cell duplicate functioning unit for duplicating cells by the number of that of necessary output paths in response to an output from said buffer;

said cell duplicate functioning unit including a distribution identification (ID) conversion table for storing distribution ID information retrieved in accordance with an input virtual call identifier (VCI), and a distribution ID output and VCI conversion table for storing output VCIs which are retrieved in accordance with a distribution ID in said distribution ID conversion table, said cell duplicate functioning unit searching said distribution ID output and VCI conversion table to obtain a corresponding output VCI and transmits duplicate information to said output path.

15. A broadcast service system wherein a broadcast transmission terminal is connected to a broadcast reception terming through a network including plural switching nodes, the system comprising:

plural distribution modules for controlling distributively input information, each of said plural distribution modules being used as an external circuit to an exchange switch within each corresponding one of said switching nodes, said distribution modules being arranged to some of said plural switching nodes to arrange distributively within said network, wherein when broadcasting begins, information is transmitted from said broadcast transmission terminal to a distribution module on a transmission side arranged to a switching node on said transmission side via said switching node on said transmission side accommodating said broadcast transmission terminal, from said distribution module on said transmission side to a distribution module arranged to a switching node on said reception side via said switching node on said reception side accommodating said broadcast reception terminal, said information being accessed from said broadcast reception terminal to said distribution module on said reception side via said switching node on said reception side, and permanent virtual connection lines preset respectively between said broadcast transmission terminal and said switching node connected thereto, between said broadcast reception terminal and said switching node connected thereto, between confronting switching nodes, and between each distribution module and a corresponding switching node, wherein said permanent virtual connection lines are connected using said switching node to realize a broadcast service to said broadcast reception terminal from said broadcast transmission terminal via a switching node with a distribution module.

16. A broadcast service system according to claim 15, wherein bands are allocated to said permanent virtual connection lines when a broadcast service is started.

17. A broadcast service system according to claim 15, wherein each switching node is connected to a miscellaneous device, wherein said switching node sets each of said permanent virtual connection lines, based on a connection setting information from said miscellaneous device.

18. A broadcast service system according to claim 15, further comprising a broadcast service control device connected to said switching node for determining a connection configuration of said broadcast service, whereby said switching node sets a permanent virtual connection line in accordance with a command from said broadcast service control device when a broadcast service is started.

* * * * *